(12) United States Patent
So

(10) Patent No.: US 7,016,575 B2
(45) Date of Patent: Mar. 21, 2006

(54) TAP-OFF CAPABLE OF EASILY EXTENDING HYBRID FIBER COAXIAL (HFC) NETWORK

(75) Inventor: Heung Seob So, Seoul (KR)

(73) Assignee: Corenet, Inc., Seoul (KR)

( * ) Notice: Subject to any disclaimer, the term of this patent is extended or adjusted under 35 U.S.C. 154(b) by 99 days.

(21) Appl. No.: 10/307,350

(22) Filed: Dec. 2, 2002

(65) Prior Publication Data

US 2003/0113068 A1 Jun. 19, 2003

(30) Foreign Application Priority Data

Dec. 15, 2001 (KR) ............... 10-2001-0079641

(51) Int. Cl.
 *G02B 6/26* (2006.01)
 *G02B 6/28* (2006.01)
(52) U.S. Cl. ............... 385/48; 385/24; 385/42
(58) Field of Classification Search ............. 385/16, 385/47–48; 439/207, 215
See application file for complete search history.

(56) References Cited

U.S. PATENT DOCUMENTS

| 6,074,250 A * | 6/2000 | Tang ............... 439/579 |
| 2002/0132506 A1 * | 9/2002 | Wilson et al. ........ 439/207 |
| 2003/0012481 A1 * | 1/2003 | Fant et al. ........... 385/16 |

FOREIGN PATENT DOCUMENTS

| JP | 09-009238 | 1/1997 |
| JP | 2001-211434 | 8/2001 |
| KR | 1999-017738 | 3/1999 |

* cited by examiner

*Primary Examiner*—Frank G. Font
*Assistant Examiner*—Eric Wong
(74) *Attorney, Agent, or Firm*—Oblon, Spivak, McClelland, Maier & Neustadt, P.C.

(57) ABSTRACT

A tap-off capable of easily extending a hybrid fiber coaxial network without complicated cable handling and signal disruptions. The tap-off comprises a primary distributor connected to a directional coupler. Additional distributors are divergently connected to the primary distributor and include terminal distributors. Bridges are divergently connected to the terminal distributors, and an intermediate distributor is connected between the directional coupler and the primary distributor. The tap-off also has at least one extension port and at least one intermediate cable connecting the extension port with the intermediate distributor. Each bridge is connected to a drop cable for providing a signal to a subscriber. The intermediate distributor distributes the signal to the primary distributor and to the extension port. The tap-off further comprises an additional extension tap-off, which includes an input port connected to the extension port, distributors, and bridges.

9 Claims, 10 Drawing Sheets

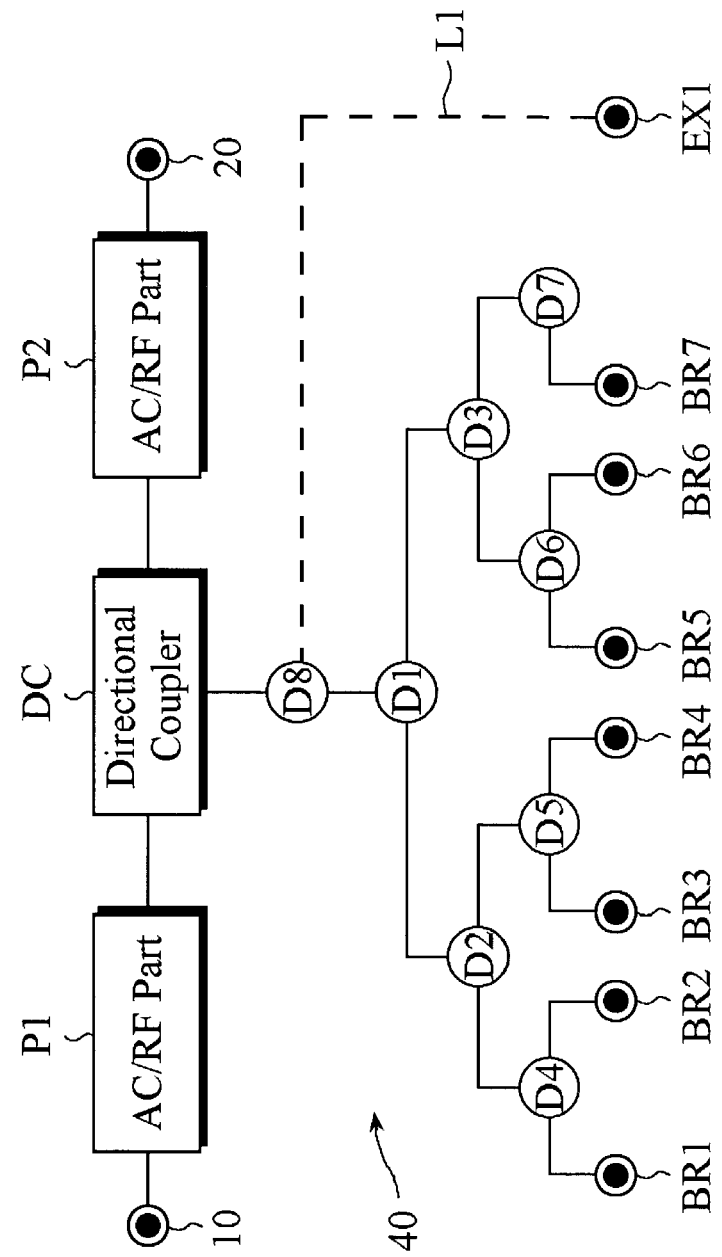

TAP-OFF CAPABLE OF EASILY EXTENDING HYBRID FIBER COAXIAL (HFC) NETWORK

FIELD OF THE INVENTION

The present invention relates to a tap-off, and particularly to a tap-off capable of easily extending a hybrid fiber coaxial (HFC) network.

BACKGROUND OF THE INVENTION

HFC networks are used to deliver cable TV services and high speed data services. A cable TV distribution system generally collects commercial programming from large "off air" TV antennas, a satellite receiving station, or locally originated signals and then distributes these signals to individual subscribers via HFC networks. The collected signals are processed in the headend, then combined and routed to form a serving signal to the subscriber through fiber and feeder paths of the distribution system.

The signal travels along the feeder cable until it reaches the location of the first subscriber (or subscribers). At this point, it is necessary to tap off signals from the feeder cable so that it can be delivered to the subscriber(s) residence.

FIG. 1a shows schematically an inner structure of a conventional tap-off, and FIG. 1b shows a connecting structure of conventional tap-offs.

Common prior art tap-offs are for four, eight or sixteen subscribers. The tap-off shown in FIG. 1a is for eight subscribers. The tap-off includes an input terminal 10 to which signals from a service provider are inputted through a feeder cable 15, an output terminal 20 from which the signals are outputted, AC/RF (Alternating Current/Radio Frequency) parts P1 and P2, a directional coupler DC, seven distributors D1 to D7, and eight bridges BR1 to BR8, where each bridge is connected to a drop cable (not shown) that provides the signal to a subscriber.

The signal level required at the bridge is dictated by the signal level input requirements of the subscriber, as determined by the number of TV receiver devices or the like that are to be connected to the system and the distance between the tap-off and the subscriber.

For multiple dwelling units such as apartment buildings, two or more tap-offs are connected in series by a coaxial cable 5, as shown in FIG. 1b, and signal levels tend to diminish as the signal propagates away from the transmission source. Thus, connecting a plurality of tap-offs in series diminishes the signal quality received by the subscriber further downstream.

The problem that exists in the art is that if one of the tap-offs for the multiple dwelling unit fails, it must be replaced or serviced which results in disruption of the signal and cable service for all remaining subscribers farther down the cable and away from the headend.

In addition, cable handling becomes more complicated and burdensome for the service technician due to the physical interconnection of the plurality of tap-offs.

SUMMARY OF THE INVENTION

It is an object of the present invention to overcome the problems in the prior art and provide a tap-off capable of easily extending a hybrid fiber coaxial network without complicated cable handling and signal disruption, which has an extension port standardized equal to a common bridge.

In order to achieve the above objects, the present invention provides a tap-off capable of easily extending a hybrid fiber coaxial network including an input terminal, an AC/RF part, a directional coupler and an output terminal. The tap-off comprises a primary distributor connected to the directional coupler; additional distributors divergently connected to the primary distributor and including terminal distributors; bridges divergently connected to the terminal distributors, each bridge connected to a drop cable for providing a signal to a subscriber; an intermediate distributor connected between the directional coupler and the primary distributor; at least one extension port provided separately from the bridges; and at least one intermediate cable connecting the extension port with the intermediate distributor. The intermediate distributor distributes the signal outputted from the directional coupler to the primary distributor and to the extension port through the intermediate cable.

The extension port can be implemented as one of the bridges.

The tap-off further comprises an additional extension tap-off for extending the hybrid fiber coaxial network. The extension tap-off includes an input port connected to the extension port, distributors connected to the input port and including terminal distributors, and bridges divergently connected to the terminal distributors. Each bridge is connected to a drop cable for providing a signal to a subscriber.

BRIEF DESCRIPTION OF DRAWINGS

The above object and features of the present invention will become more apparent from the following description of the preferred embodiments given in conjunction with the accompanying drawings.

FIG. 2 shows schematically an inner structure of a tap-off in accordance with a first embodiment of the present invention.

FIGS. 8a to 8d show connecting structures of the tap-offs of the present invention and the extension tap-off depicted in FIG. 7a.

DETAILED DESCRIPTION OF THE PRESENT INVENTION

Figure 1A:
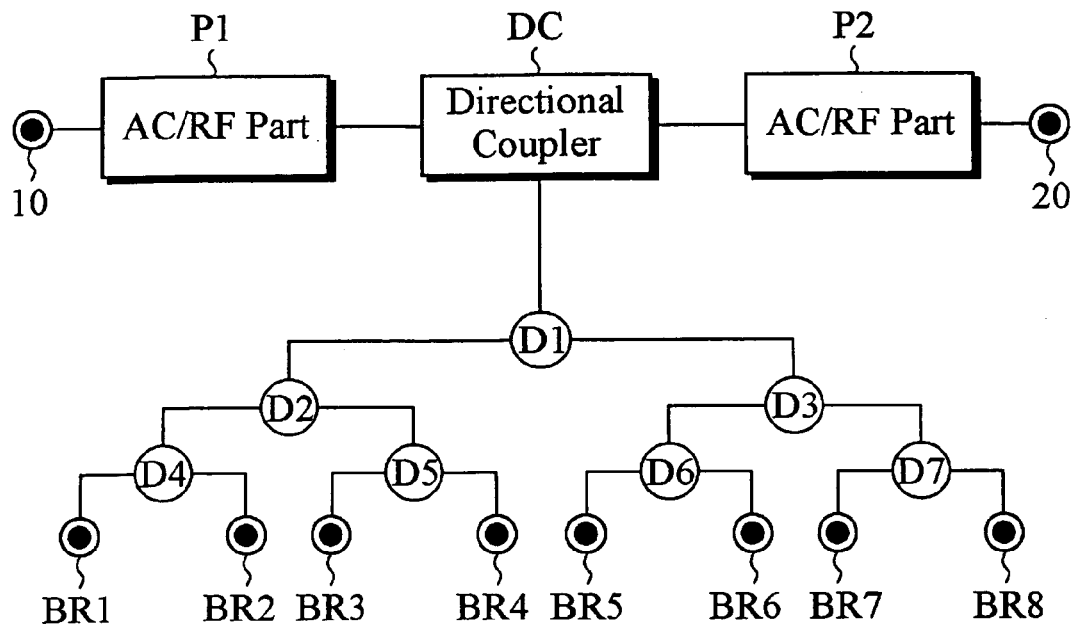
FIG. 1a shows schematically an inner structure of a conventional tap-off.

Preferred embodiments of the present invention will now be described with reference to the accompanying drawings. The same components of the present invention as those of the prior art are shown by the same reference numerals.

Figure 6A:
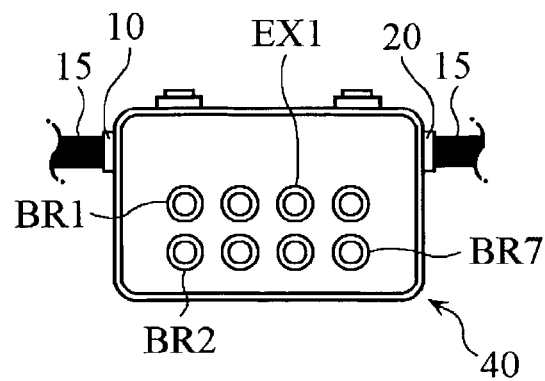
FIGS. 6a to 6d show the tap-offs in accordance with the preferred embodiments of the present invention.

FIGS. 2 and 6a show a tap-off in accordance with a first embodiment of the present invention. The inventive tap-off 40 includes an input terminal 10, AC/RF parts P1 and P2, a directional coupler DC, an output terminal 20, first to seventh distributors D1 to D7, an intermediate distributor D8, first to seventh bridges BR1 to BR7 and an extension port EX1.

A feeder cable 15 is connected to the input terminal 10 and to the output terminal 20 to tap the signal from the feeder cable 15 and thereby provide the required AC power and RF signal for the tap-off 40. The AC/RF part P1 transmits the RF signal to the bridges BR1 to BR7 and to the extension port EX1 via the distributors D1 to D8. And, the AC/RF part P2 transmits the AC power and the RF signal to the feeder cable 15 through the output terminal 20.

The directional coupler DC differentially distributes the RF signal from the AC/RF part P1. The first to seventh distributors D1 to D7 distribute the RF signal to the bridges BR1 to BR7, which are connected to drop cables (not shown) for the subscribers, and a signal is provided to individual subscribers.

The intermediate distributor D8 is electrically connected to the directional coupler DC and the first distributor D1 and disposed therebetween. The intermediate distributor D8 distributes the RF signal from the directional coupler DC to the first distributor D1 and to the extension port EX1. In other words, the intermediate distributor D8 is of a 2-distribution type. The extension port EX1 is connected to the intermediate distributor D8 by an intermediate cable L1. The relative difference in power between the signal outputted from the intermediate distributor D8 to the first distributor D1 or to the intermediate cable L1 and the signal outputted from the directional coupler DC, which is equal to ten times the common logarithm of the ratio of the signal from the intermediate distributor D8 to the signal from the directional coupler DC, is about −3.5 dB. The relative difference in power between the signal outputted from the intermediate distributor D8 to the first distributor D1 or to the intermediate cable L1 and the signal outputted from each bridge BR1 to BR7, which is equal to ten times the common logarithm of the ratio of the signal from the intermediate distributor D8 to the signal from each bridge BR1 to BR7, is about 11 dB.

The extension port EX1 is standardized to be equal to the bridges BR1 to BR7.

Another tap-off 44 (see FIG. 5) for extending a HFC network, is connected to the extension port EX1 of the tap-off 40 by a coaxial cable, when the number of subscribers increases beyond the capacity of the tap-off 40, which will be described below.

The first distributor D1 receives the signal outputted from the intermediate distributor D8 and distributes the signal to the second and third distributors D2 and D3. The second distributor D2 distributes the signal to the fourth and fifth distributors D4 and D5, and the third distributor D3 distributes the signal to the sixth and seventh distributors D6 and D7.

The fourth distributor D4 distributes the signal to the first and second bridges BR1 and BR2. The fifth distributor D5 distributes the signal to the third and fourth bridges BR3 and BR4. The sixth distributor D6 distributes the signal to the fifth and sixth bridges BR5 and BR6. And, the seventh distributor D7 transmits the signal only to the seventh bridge BR7. In other words, the fourth to seventh distributors D4 to D7 function as a terminal distributor.

As the tap-off 40 according to the first embodiment of the present invention is provided with seven bridges BR1 to BR7 and one extension port EX1, the tap-off 40 can use the same housing as a conventional tap-off for eight subscribers, as shown in FIG. 6a. Accordingly, there is an advantage provided when manufacturing the inventive tap-off 40, as a conventional tap-off housing for eight subscribers may be used without modification. One skilled in the art can appreciate that a common tap-off having four or sixteen bridges can be transformed into the inventive tap-off by converting one of the bridges to the extension port, after having the benefit of this disclosure.

Figure 3:
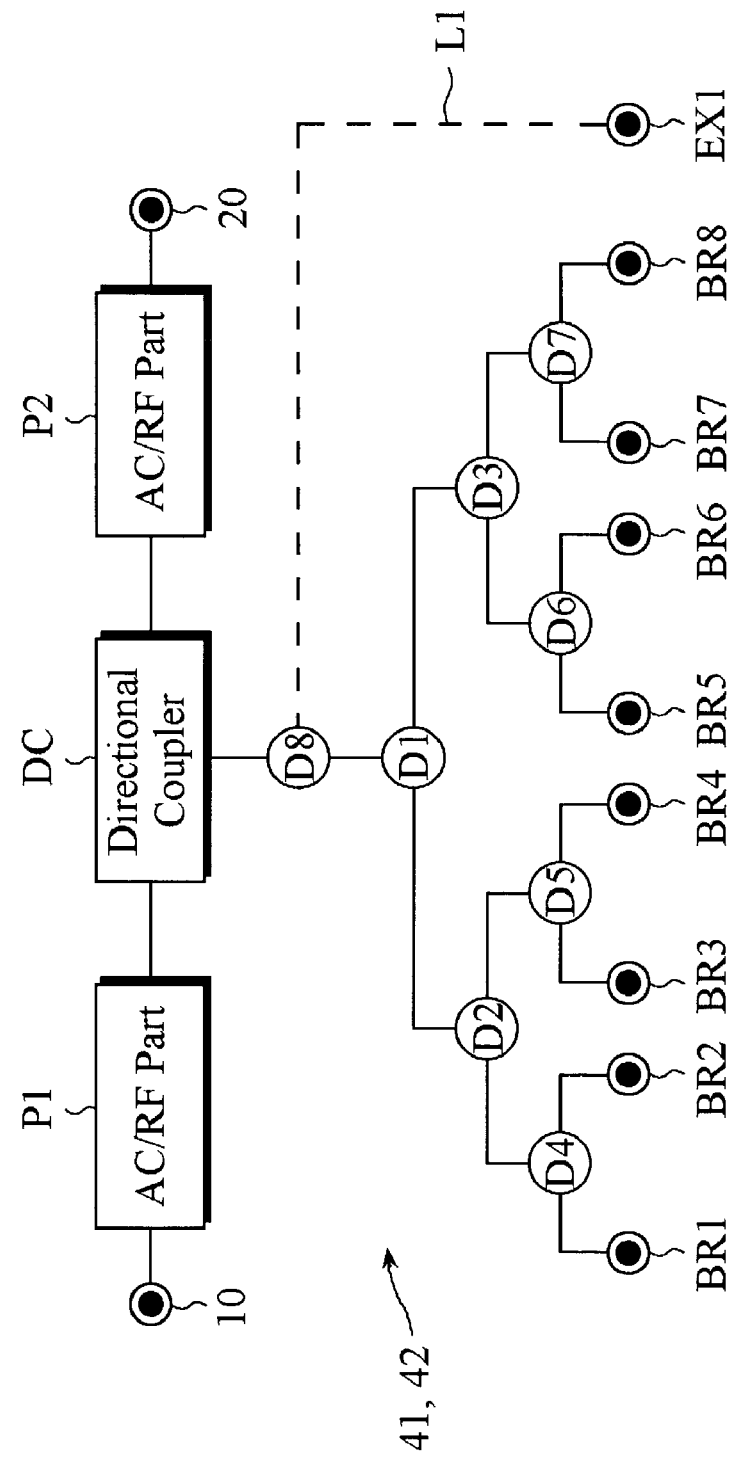
FIG. 3 shows schematically an inner structure of a tap-off in accordance with a second embodiment of the present invention.
Figure 6B:
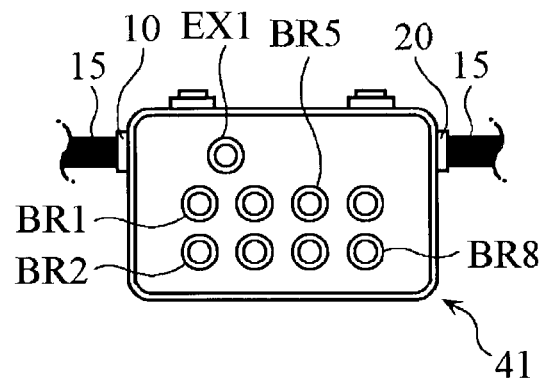
Figure 6C:
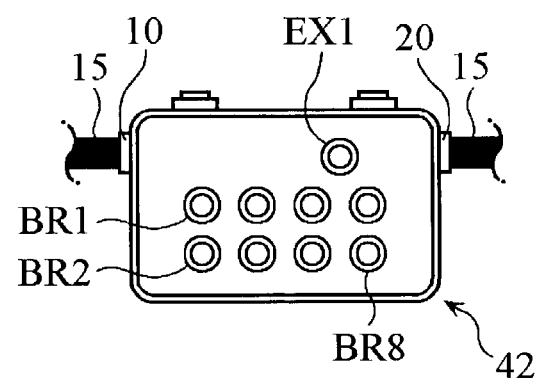

A tap-off 41 or 42 according to a second embodiment of the present invention will be described with reference to FIGS. 3, 6b and 6c.

As shown in the drawings, the tap-off 41 or 42 is identical with the tap-off 40 of the first embodiment, except that an eighth bridge BR8 is further provided and the seventh distributor D7 distributes the signal to the bridges BR7 and BR8. One skilled in the art will appreciate that the tap-off 40 of the first embodiment can be achieved by converting one of eight bridges of a conventional tap-off to the extension port without modifying the conventional tap-off housing, and the tap-off 41 or 42 of the second embodiment can be achieved by adding one bridge, i.e. the extension port, to the conventional tap-off.

Figure 4:
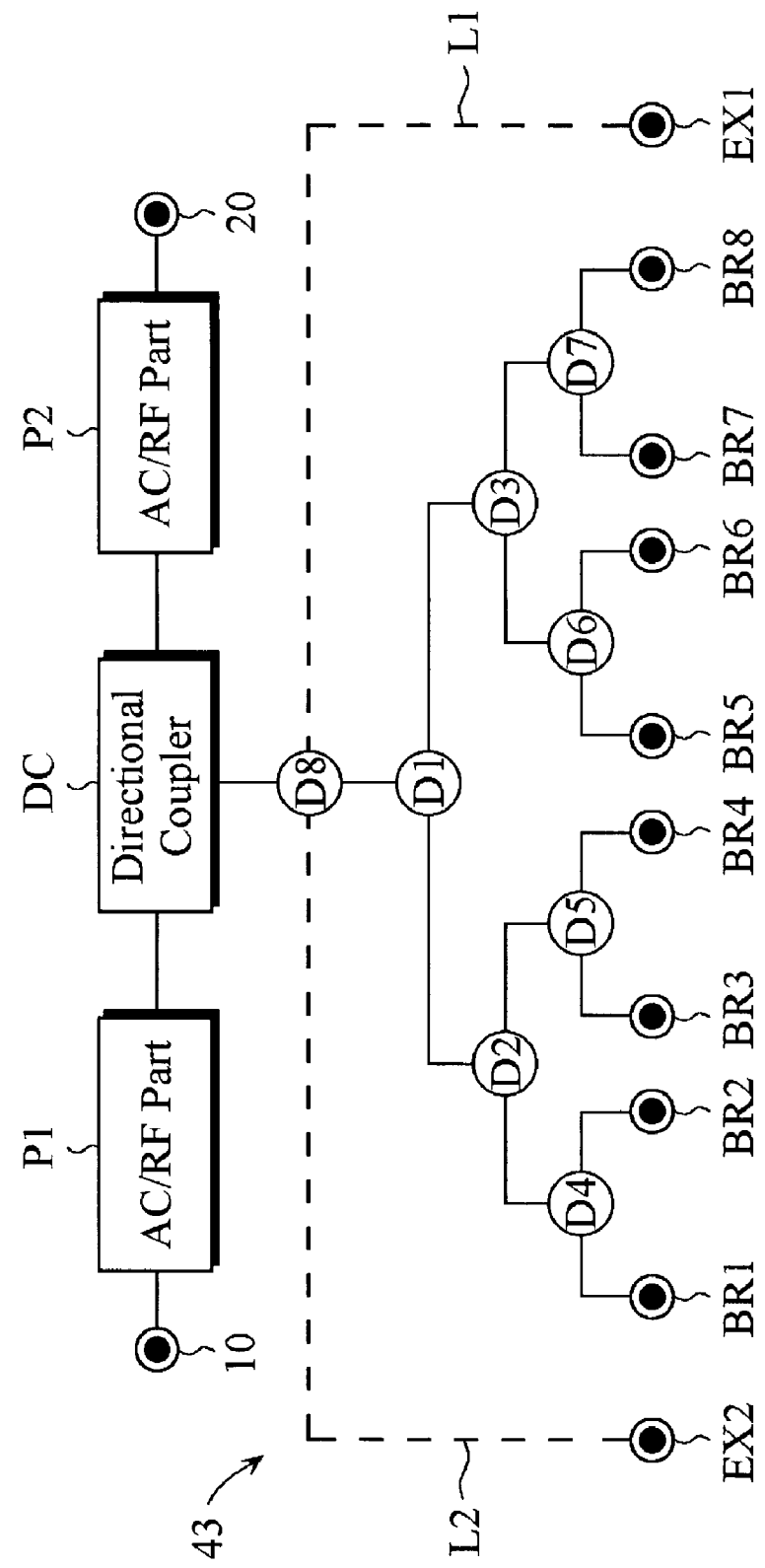
FIG. 4 shows schematically an inner structure of a tap-off in accordance with a third embodiment of the present invention.
Figure 6D:
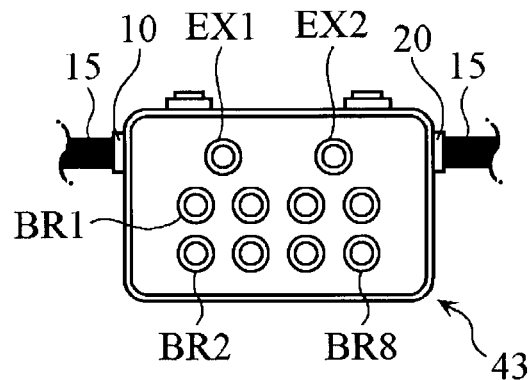

A tap-off 43 according to a third embodiment of the present invention will be described with reference to FIGS. 4 and 6d.

As shown in the drawings, the tap-off 43 is identical with the tap-off 41 or 42 of the second embodiment, except that an additional extension port EX2 and an additional intermediate cable L2 for connecting the extension port EX2 with the intermediate distributor D8 are further provided. The intermediate distributor D8 distributes the RF signal from the directional coupler DC to the first distributor D1 and to the extension ports EX1 and EX2. In other words, the intermediate distributor D8 is of a 3-distribution type. The relative difference in power between the signal outputted to the extension port EX2 from the intermediate distributor D8 and the signal outputted from each bridge BR1 to BR8 is about 11 dB, which is equal to ten times the common logarithm of the ratio of the signal transmitted to the extension port EX2 to the signal from each bridge BR1 to BR8.

An extension tap-off 44 for extending a HFC network in accordance with a preferred embodiment of the present invention will be described with reference to FIGS. 5, 7a and 7b.

Figure 5:
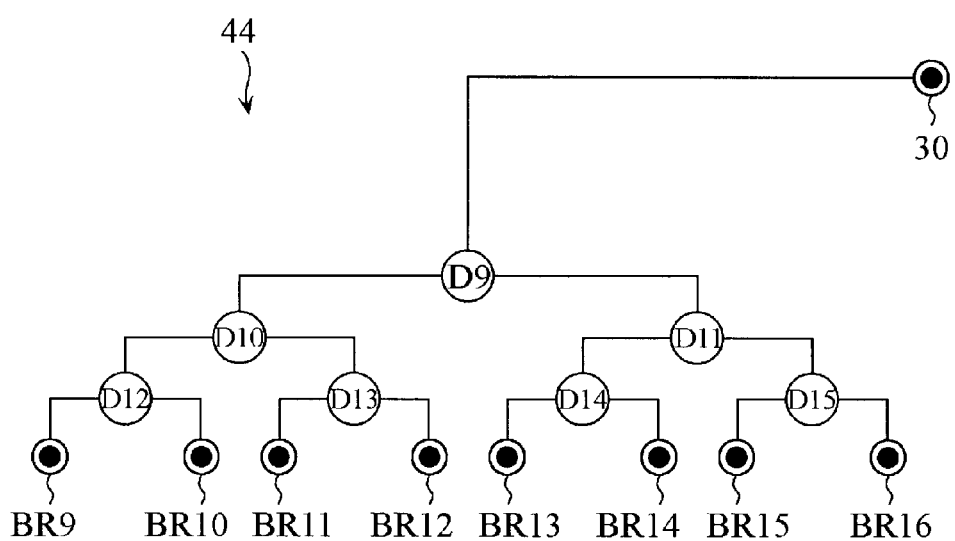
FIG. 5 shows schematically an inner structure of an extension tap-off in accordance with the present invention.

As shown in FIG. 5, the extension tap-off 44 includes an input port 30, a plurality of distributors D9 to D15, and a plurality of bridges BR9 to BR16 which are connected to the terminal distributors D12 to D15. Thus, the extension tap-off 44 provides eight additional bridges BR9 to BR16 for new subscribers.

Figure 7A:
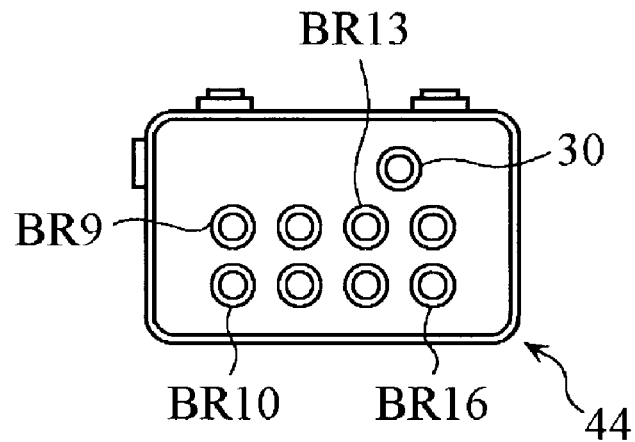
FIGS. 7a and 7b show the extension tap-offs in accordance with the preferred embodiments of the present invention.

As shown in FIG. 7a, the input port 30 of the extension tap-off 44 may be displaced on the same plane of the housing as the bridges BR9 to BR16 are displaced. In this case, the same housing as that of the tap-off 42 of the second embodiment is used for the extension tap-off 44. The input port 30 is standardized equal to the bridge.

Figure 7B:
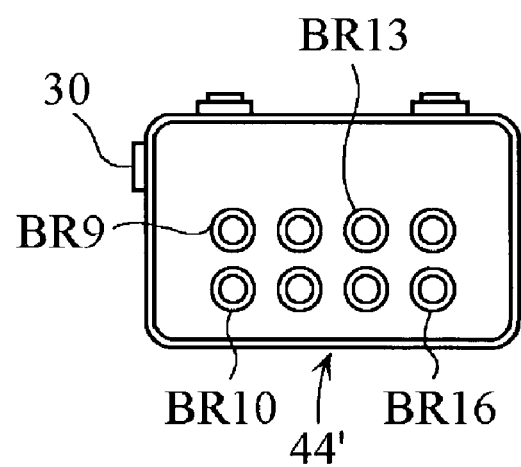

FIG. 7b also shows that the input port 30 of the extension tap-off 44' may be implemented as the input terminal 10 of the tap-off 40 of the first embodiment, when the same housing as that of the tap-off 40 is used for the extension tap-off 44'.

The operation and effect of the tap-off 40 according to the first embodiment of the present invention and the extension tap-off 44 will now be described with reference to FIGS. 2, 5 and 8a.

When an RF signal is provided from a service provider through the feeder cable 15, the signal is transmitted to the intermediate distributor D8 via the input terminal 10, the AC/RF part P1 and the directional coupler DC, and distributed to the first distributor D1 and to the extension port EX1. The signal transmitted to the first distributor D1 is distributed to the other distributors D2 to D7 and to the bridges BR1 to BR7, and then provided to subscribers. As described above, the relative difference in power between the signal outputted to the extension port EX1 from the intermediate distributor D8 and the signal outputted from each bridge BR1 to BR7 is about 11 dB, which is equal to ten times the common logarithm of the ratio of the signal transmitted to the extension port EX1 to the signal from each bridge BR1 to BR7.

Figure 8A:
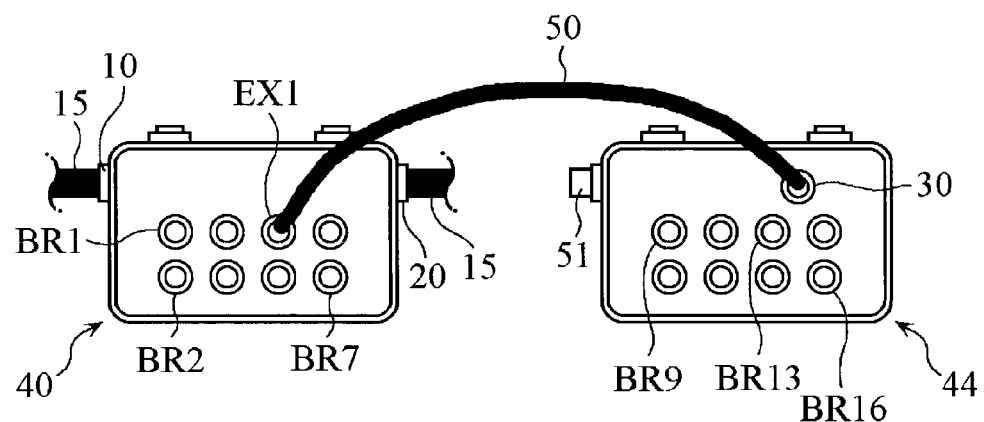

When the extension tap-off 44 is connected to the tap-off 40 by a coaxial cable 50 having connectors on both ends in such a manner that one end of the cable 50 is connected to the extension port EX1 of the tap-off 40 and the other end is connected to the input port 30 of the extension tap-off 44, as shown in FIG. 8a, the signal outputted from the extension port EX1 of the tap-off 40 is inputted to the input port 30 of the extension tap-off 44, and provided to subscribers via the distributors D9 to D15 and the bridges BR9 to BR16 in the same manner. Therefore, a signal can be provided to fifteen subscribers via the bridges BR1 to BR7 and BR9 to BR16.

The RF signal inputted to the bridges BR9 to BR16 of the extension tap-off 44 and to the bridges BR1 to BR7 of the tap-off 40 from the location of the subscriber is transmitted to the feeder cable 15 via the distributors D1 to D15, the directional coupler DC and the AC/RF part P1.

Figure 8B:
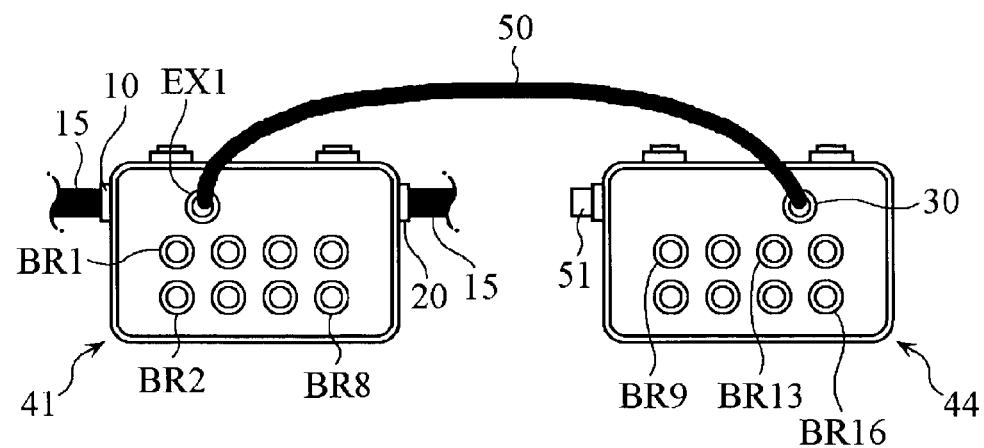
Figure 8C:
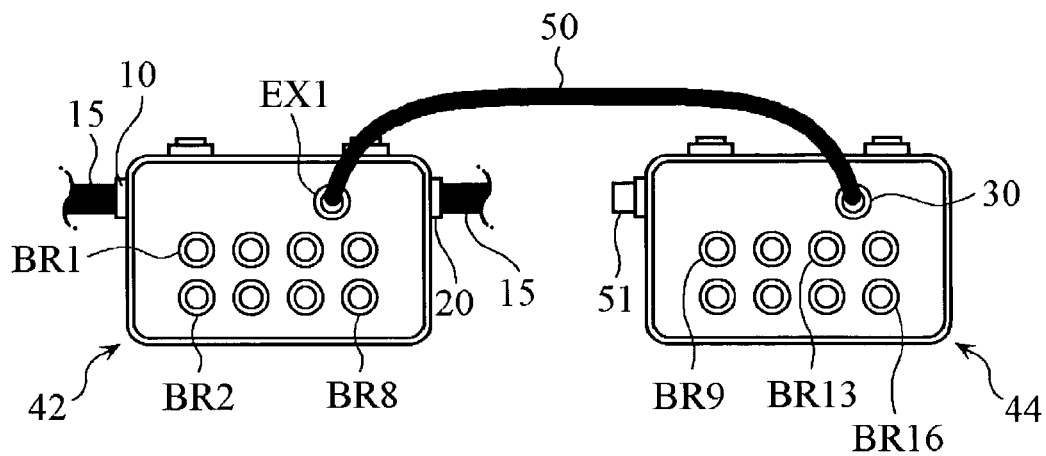

Similarly, when the extension tap-off 44 is connected to the tap-off 41 or 42 of the second embodiment by the coaxial cable 50, as shown in FIGS. 8b and 8c, sixteen drop cables for providing the signal to the subscribers can be accommodated.

Figure 8D:
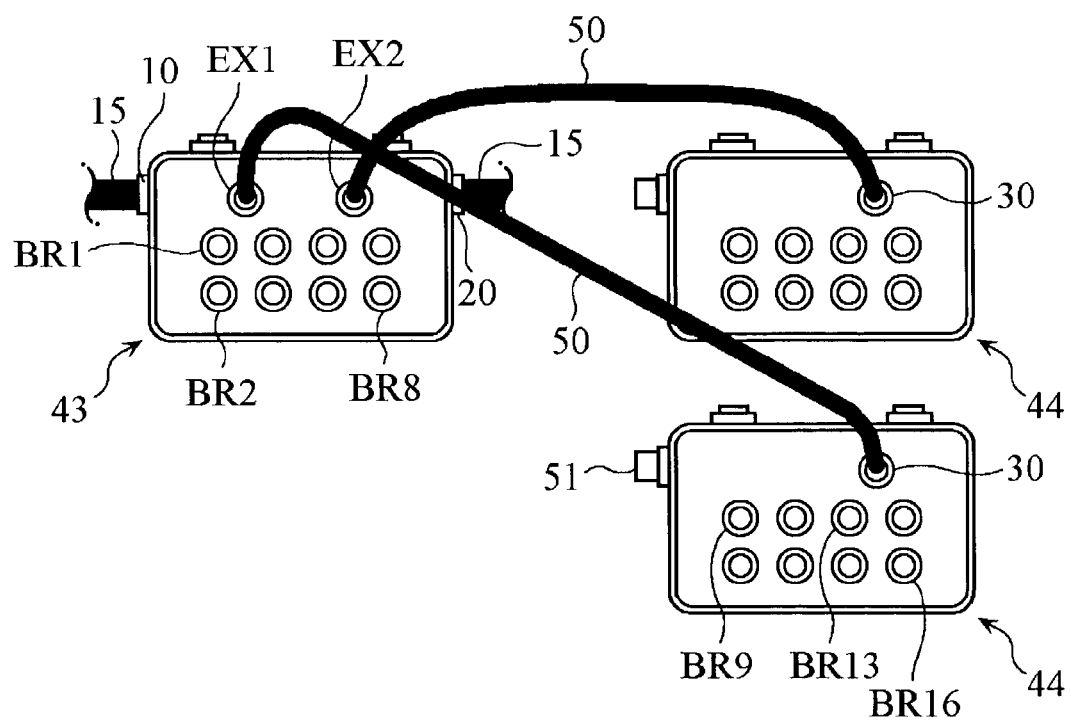

When two extension tap-offs 44 are respectively connected to the extension ports EX1 and EX2 of the tap-off 43 of the third embodiment by the coaxial cables 50, as shown in FIG. 8d, twenty-four drop cables for providing signal to the subscribers can be accommodated.

Reference numeral 51 in FIGS. 8a to 8d identifies a cap attached to a hole (not shown) for the input terminal to prevent foreign materials like water from entering the housing through the hole, because the extension tap-off 44 (see FIG. 7a) and the tap-off 42 use the same-shaped housing.

Figure 9:
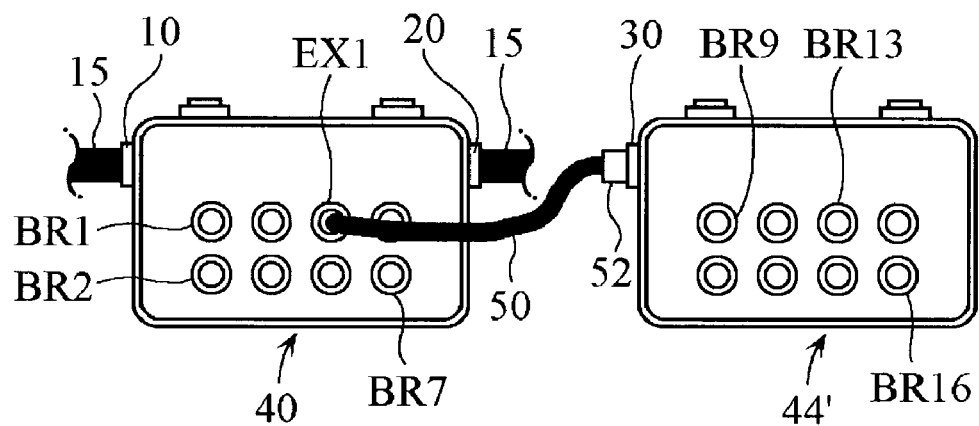
FIG. 9 shows a connecting structure of the tap-off depicted in FIG. 6a and the extension tap-off depicted in FIG. 7b.

FIG. 9 shows a connecting structure of the tap-off 40 depicted in FIG. 6a and the extension tap-off 44' depicted in FIG. 7b.

Figure 1B:
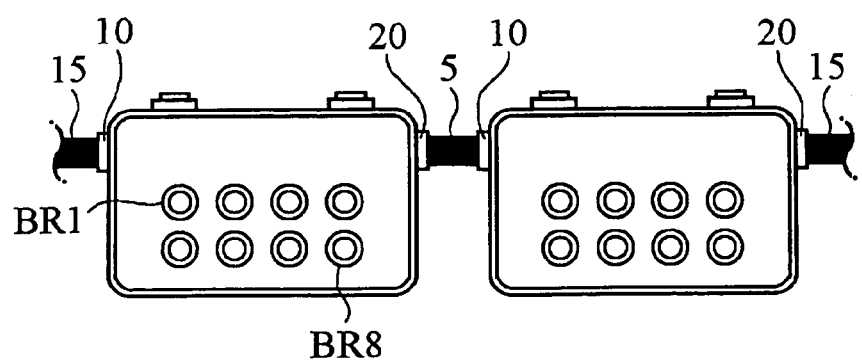
FIG. 1b shows a connecting structure of conventional tap-offs.

As shown, when the extension tap-off 44' uses the same housing as the tap-off 40 of the first embodiment or a conventional tap-off, the input port 30 of the extension tap-off 44' is implemented as the input terminal 10 (see FIG. 1b or 6a) and is provided with an adapter 52 to which the connector of the coaxial cable 50 is connected.

As described above in detail, the inventive tap-off can easily extend a HFC network to provide services to more subscribers without complicated cable handling and signal disruption by providing an extension port standardized equal to a common bridge, to which an another extension tap-off is connected by a coaxial cable.

In addition, as the signal propagates away from the transmission source, the quality of the signal diminishes less than when traveling along conventional tap-offs connected in series.

While the present invention has been shown and described with respect to particular embodiments, it will be apparent to those skilled in the art that many changes and modifications may be made without departing from the spirit and scope of the invention as defined in the appended claims.

What is claimed is:

1. A tap-off configured to easily extend a hybrid fiber coaxial network including a housing containing an input terminal, an AC/RF part, a directional coupler and an output terminal, comprising:
   a primary distributor connected to said directional coupler;
   additional distributors divergently connected to said primary distributor and including terminal distributors;
   bridges divergently connected to said terminal distributors, each bridge connected to a drop cable for providing a signal to a subscriber;
   an intermediate distributor connected to said directional coupler and said primary distributor, the intermediate distributor disposed between said directional coupler and said primary distributor;
   at least one extension port provided separate from said bridges on the same plane of said housing where said bridges are located; and
   at least one intermediate cable connecting said extension port with said intermediate distributor,
   wherein said intermediate distributor distributes the signal outputted from said directional coupler to said primary distributor and to said extension port through said intermediate cable.

2. The tap-off of claim 1, wherein said tap-off comprises two extension ports and two intermediate cables, and said intermediate distributor is of a 3-distribution type, such that said signal outputted from said directional coupler is distributed to said primary distributor and to the two extension ports through the two intermediate cables.

3. The tap-off of claim 1, wherein each said additional distributor is of a 2-distribution type, and each terminal distributor is connected to two bridges.

4. The tap-off of claim 1, wherein each said additional distributor is of a 2-distribution type, one of said terminal distributors is connected to one bridge, and the other terminal distributors are respectively connected to two bridges.

5. The tap-off of claim 1, wherein said extension port is implemented as one of said bridges.

6. The tap-off of claim 1, wherein said tap-off further comprises an additional extension tap-off for extending said hybrid fiber coaxial network, the extension tap-off including an input port connected to said extension port, distributors connected to said input port and including terminal distributors, and bridges divergently connected to said terminal distributors, each bridge connected to a drop cable for providing a signal to a subscriber.

7. The tap-off of claim 1, wherein the sum of the number of said bridges and the number of said extension ports is four.

8. The tap-off of claim 1, wherein the sum of the number of said bridges and the number of said extension ports is eight.

9. The tap-off of claim 1, wherein the sum of the number of said bridges and the number of said extension ports is sixteen.

* * * * *